United States Patent [19]
> Montierth

[11] 4,427,423
[45] Jan. 24, 1984

[54] HIGH ASPECT RATIO SOLID PARTICULATE FILTERING APPARATUS AND METHOD OF FILTERING

[75] Inventor: Max R. Montierth, Elmira, N.Y.
[73] Assignee: Corning Glass Works, Corning, N.Y.
[21] Appl. No.: 350,997
[22] Filed: Feb. 22, 1982
[51] Int. Cl.³ .............................................. B01D 39/20
[52] U.S. Cl. ......................................... 55/97; 55/484; 55/523; 55/DIG. 30; 422/171; 60/311
[58] Field of Search ........... 55/484, 502, 523, DIG. 5, 55/DIG. 30, 482, 483, 97; 210/510, 340; 422/171, 180, 188, 193; 165/8; 252/477 R; 428/116–118; 501/112, 119, 80; 60/295, 299, 311; 29/163.5 F

[56] References Cited

U.S. PATENT DOCUMENTS

| | | | |
|---|---|---|---|
| 1,714,854 | 5/1929 | Dollinger | 55/484 |
| 2,674,521 | 4/1954 | Houdry | 422/188 |
| 2,909,415 | 10/1959 | Houdry | 55/DIG. 30 |
| 3,811,845 | 5/1974 | Nakamura | 422/188 |
| 3,996,016 | 12/1976 | Wagner | 422/188 |
| 4,276,071 | 6/1981 | Outland | 55/523 |
| 4,329,162 | 5/1982 | Pitcher, Jr. | 55/523 |
| 4,343,631 | 8/1982 | Cilberti | 55/523 |

FOREIGN PATENT DOCUMENTS 522334  7/1976  U.S.S.R. ............... 422/179

*Primary Examiner*—David L. Lacey
*Attorney, Agent, or Firm*—R. N. Wardell

[57] ABSTRACT

A solid particulate filtering apparatus employs a plurality of unidirectional flow type honeycomb filter elements operating in parallel to provide improved particulate loading and useful operating time than was provided by the single, long, narrow type of unidirectional flow filter previously employed. The effective collective diameter of the plurality of elements is greater than their effective length and, preferably, their individual effective diameters approximate or exceed their individual effective lengths to maximize the improved particulate loading capacity and operating time characteristics of the apparatus. The plurality of smaller elements are also subjected to lower thermally induced stresses than would be a single larger filter of the same effective aspect ratio and the described filter housing fosters flow about the outside of the elements further reducing the occurrence of stresses induced by thermal gradients within the filters. The apparatus is particularly useful for diesel engine exhaust and other solid particulate filtering applications involving fluids at elevated temperatures. A method of filtering solid particulates from fluids by use of the apparatus comprises dividing a contaminated-fluid-carrying conduit into an upstream portion and a downstream portion with a partition, then positioning the plurality of filter elements through the partition, and thereafter passing the fluid through the conduit and filters.

8 Claims, 5 Drawing Figures

HIGH ASPECT RATIO SOLID PARTICULATE FILTERING APPARATUS AND METHOD OF FILTERING

BACKGROUND OF THE INVENTION

It is widely known that honeycomb structures formed from ceramic or other porous materials can be used to filter solid particulates and larger particles from fluids passed therethrough including carbonaceous particulates from the exhaust gases of diesel engines. There are two basic types of honeycomb solid particulate honeycomb filters: unidirectional flow and cross-flow. This invention relates to the former.

A unidirectional flow type honeycomb filter is formed by a matrix of thin interconnected porous walls defining an inlet and an outlet end face on opposing outer surfaces of the filter and a multiplicity of hollow cells extending through the filter between the two end faces. An inlet group of cells is formed by closing the open ends of some of the cells near the outlet end face. An outlet group is similarly formed by closing the open ends of other cells near the inlet end face. A porous outer wall is typically provided around the matrix and between the end faces. Fluid enters the filter primarily at the inlet end face through the inlet cells but may also enter through the outer wall, if porous. The thin walls of the matrix are provided with internal interconnected open porosity of a volume and size sufficient to enable the fluid to flow at least across their narrow dimensions and, if desired, through their longer dimensions between adjoining and/or neighboring cells while preventing at least a significant portion of the particulates and larger particles from flowing in any direction across and through the thin walls. Trapped particulates are deposited on and within the thin wall surfaces forming the inlet cells. Diesel exhaust particulate filters (hereinafter referred to as "DPF's"), as well as molten metal and heat recovery wheel filters of the unidirectional flow type are described in a pending application Ser. No. 165,646, filed July 3, 1980 and assigned to the assignee hereof, which is incorporated by reference herein.

Unidirectional flow type honeycomb filters are preferred for diesel particulate filter application because they are relatively straightforward to manufacture and can be mounted in a housing and inserted into an exhaust system like a muffler or catalytic converter. Prior practice has been to maximize the cross-sectional diameter of a DPF transverse to its cells to the extent allowed by vertical and lateral vehicular clearances and then to extend the length of the filter to provide the volume required to accomplish the desired filtration of the exhaust gases. This has typically resulted in DPF's having lengths greater, often many times greater, than their diameters.

It is desirable to maximize the useful operating time and/or particulate loading capacity of DPF's to minimize the cost and inconvenience associated with their replacement and/or regeneration. Both characteristics are effectively limited, among other factors, by the back pressure generated or flow rate allowed by the filter. A filter has an initial pressure drop (i.e., the difference in pressure between the contaminated fluid upstream and filter fluid downstream caused by the presence of the filter therebetween) which increases during use with the entrapment of particles and particulates in and on the thin walls forming the filter's inlet cells. Similarly the filter also has an initial flow rate which decreases with particulate build-up. Depending upon the application, either may control when the filter must be replaced or regenerated. The useful operating life of a DPF is generally controlled by the maximum back pressure which can be sustained by the diesel engine with which it is used.

DEFINITIONS

As DPF's and other such unidirectional flow type honeycomb filters may be provided in various configurations reference will be made hereinafter to their "effective diameter" and "effective length". The former is the diameter of a circular area equal to the cross-sectional area of a filter transverse to the central longitudinal axes of its cells. The latter is that length which, when multiplied by the transverse cross-sectional area, equals the volume of the filter. The "effective diameter" of a plurality of filters (i.e. plurality of individual filter elements) acting in parallel is the diameter of a circular area equal to the sum of the transverse cross-sectional areas of the plurality of filters. The "effective length" is again that length which, when multiplied by the collective transverse cross-sectional area of the plurality of filter, equals the collective volume of the filters. By comparison, a plurality of filters operating in series have an effective diameter which provides a circular area equal to the average transverse cross-sectional area of the filters in series and an effective length which, when multiplied by the average transverse cross-sectional area, equals the collective volume of the filters. The aspect ratio of the filter(s) is the ratio of their effective diameter to their effective length.

OBJECTS OF THE INVENTION

It is an object of this invention to provide a novel solid particulate filter apparatus having improved particulate capacity.

It is yet another object of the invention to provide a novel solid particulate filter apparatus having increased operating time.

It is yet another object of the invention to provide a novel solid filtering apparatus having reduced rate of pressure drop buildup and/or flow rate reduction during use.

It is yet another object of the invention to provide a novel diesel particulate filtering apparatus.

It is yet another object of the invention to minimize the magnitude of radial thermal gradients in diesel particulate filtering apparatus employing increased aspect ratio filtration.

SUMMARY OF THE INVENTION

I have discovered that pressure drop buildup and/or flow rate reduction during the operation of a unidirectional flow type honeycomb filter is directly related, inter alia, to the reciprocal of the aspect ratio (i.e. to the ratio of effective length to effective diameter) of the filter and that by increasing the aspect ratio (i.e. effective diameter to effective length ratio) for any filter of a given composition, volume and thin wall surface area, the rate of pressure drop buildup or flow rate reduction during use is correspondingly reduced and, more importantly, the particulate loading capacity and useful operating time of the filter to reach a given maximum pressure drop or minimum flow rate is increased. Accordingly, my invention is a solid particulate filtration apparatus employing a plurality of unidirectional flow type filter elements in parallel so as to achieve an increased effective diameter to effective length ratio. The invention is described in terms of a diesel engine exhaust filtering apparatus which provides a reduced buildup of pressure and improved particulate capacity and useful operating time performance. Because thermal stresses are directly related to thermal gradients and the likelihood of radial thermal gradients increases with increased filter diameter, the use of a plurality of elements in the filtration of diesel exhaust and other fluids at elevated temperatures instead of a single filter of equivalent aspect ratio also reduces the thermal stresses to which each element is exposed. Embodiments are described each having a plurality of filter elements mounted in a housing divided by a partition into an inlet and outlet chamber. Each filter element is positioned across the partition with its inlet end face exposed to the contaminated fluid entering the inlet chamber and its outlet end face in communication with the outlet chamber so that the plurality of elements act in parallel to filter the fluid.

According to yet another important feature of the invention, the particulate capacity and useful operating life of the apparatus are further improved by providing a plurality of filter elements each having an effective diameter greater than its effective length.

BRIEF DESCRIPTION OF THE DRAWINGS

The invention may be better understood with reference to the accompanying drawings in which.

DETAILED DESCRIPTION OF THE INVENTION

Figure 1:
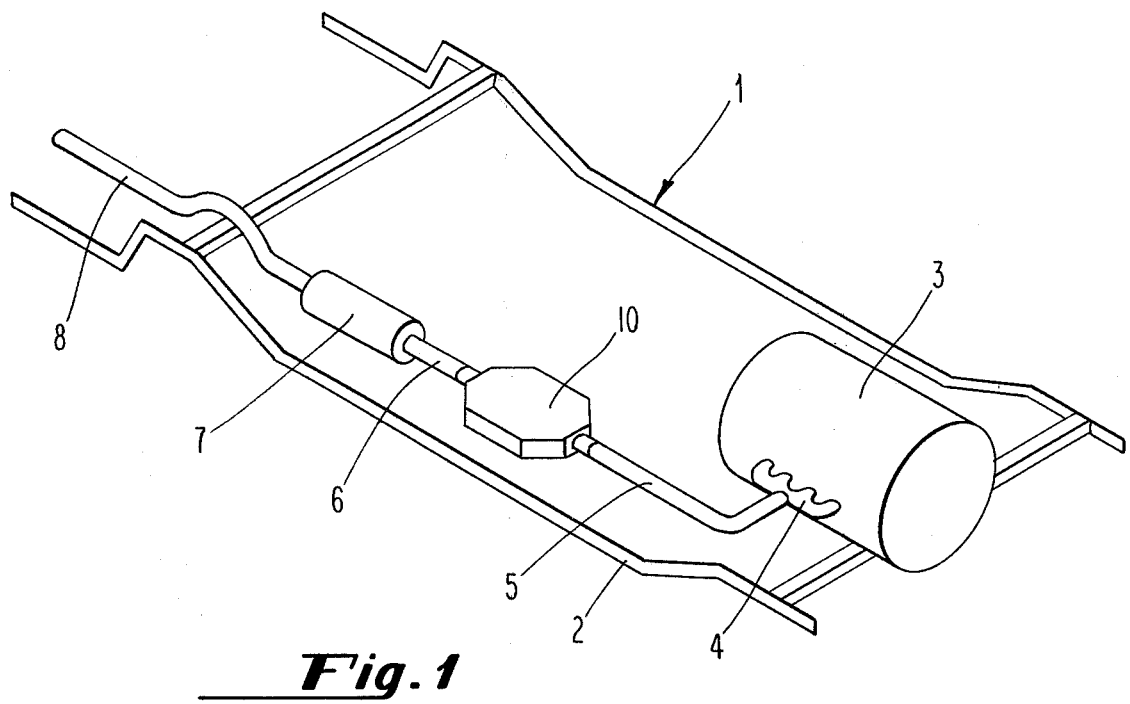
FIG. 1 is a schematic view of a diesel engine vehicle exhaust system containing the inventive filtering apparatus.
Figure 1A:
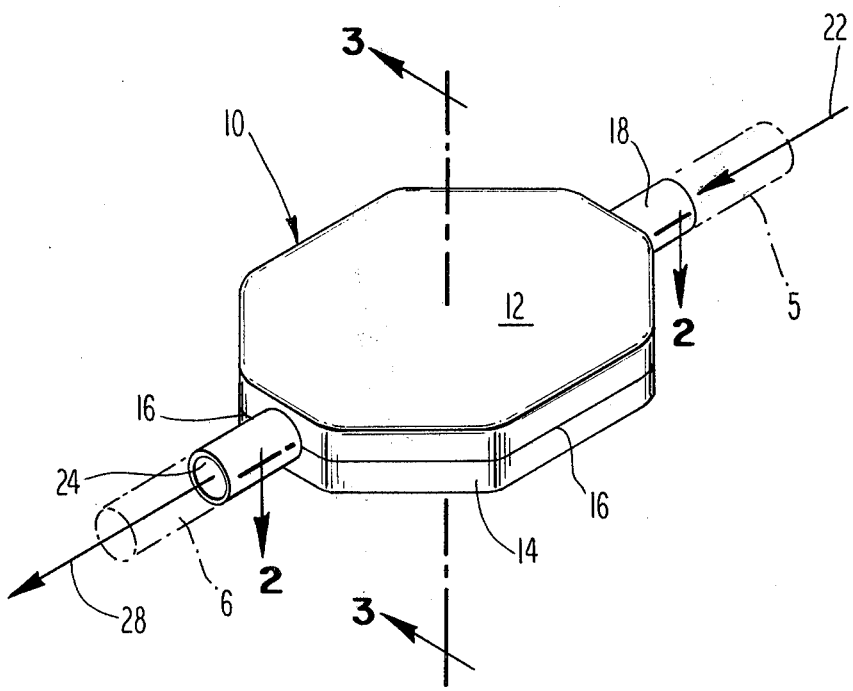
FIGS. 1a, 2 and 3 are profile and horizontally and vertically sectioned views, respectively, of a preferred filter apparatus embodiment incorporating a plurality of separate, unidirectional flow type honeycomb filter elements acting in parallel.
Figure 2:
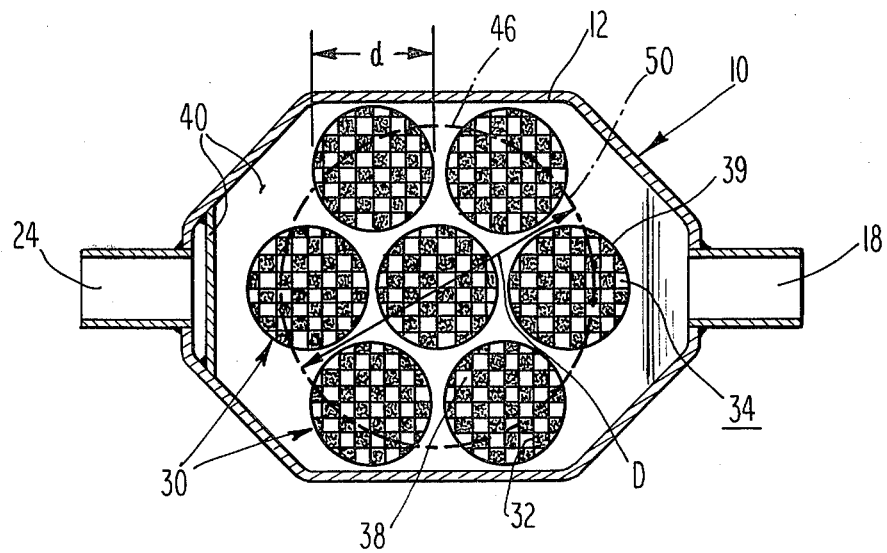
Figure 3:
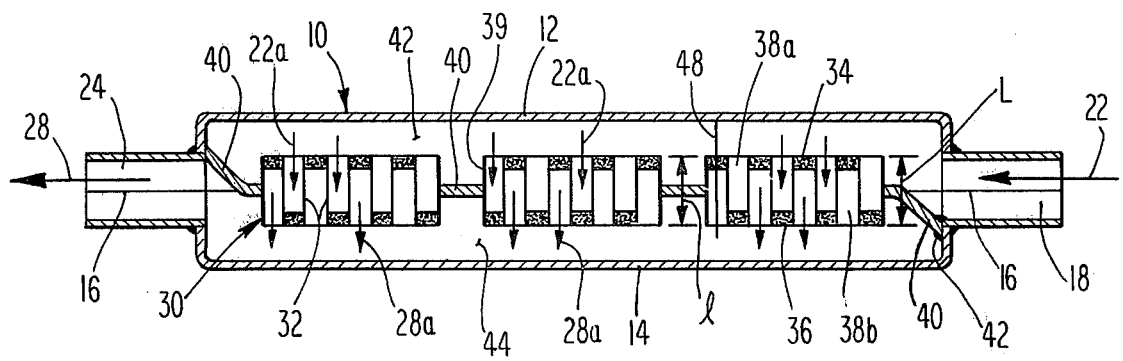

FIGS. 1a, 2 and 3 depict a preferred embodiment of the invention, a diesel engine exhaust gas solid particulate filtering apparatus, comprising a housing 10 formed from a pair of shells 12 and 14 sealably mating with one another at flanges 16. The depicted housing 10 is mounted beneath the chassis 2 of a vehicle 1 and across an exhaust pipe 5 or conduit leading from the manifold 4 of a diesel engine 3 in the vehicle 1 like a muffler or catalytic converter. The shells 12 and 14 form an inlet 18 and outlet 24 to the housing. The inlet 18 is connected by suitable means such as welding or clamps to the end of the pipe 5 opposite the manifold 4 which carries exhaust gases, indicated generally by the arrow 22, generated by the diesel engine 3 to the housing 10. The outlet 24 also mates by similar suitable means to a downstream portion of the exhaust system which carries the filtered exhaust gas, represented by an arrow 28, from the housing 10 to disposal into the atmosphere and comprising a connecting pipe 6, a tail pipe 8 open to the atmosphere and a muffler 7 connected therebetween. Catalytic conversion may be provided by filters 30 within the housing 10 or by means of a separate converter element installed across the exhaust gas stream. The shells 12 and 14 may be fixedly joined (e.g. welded, brazed or riveted) at the flanges 16 for a disposable apparatus 10 or joined in a disassemblable manner with nuts and bolts or other removable fasteners (neither depicted) for disassembly of the housing 10 and replacement or regeneration of its contained filter(s).

FIGS. 2 and 3 are diagrammatic overhead and laterally sectioned views, respectively, of the housing 10 revealing a plurality of unidirectional flow type honeycomb filter elements 30 mounted within. Each filter element 30 is formed by a matrix of inter-connected thin walls 32 defining an inlet end face 34 and outlet end face 36 at opposite ends of the element 30 and a multiplicity of hollow passages or cells 38 extending in a substantially mutually parallel fashion longitudinally through each element 30 between its end faces 34 and 36. One or both ends of each of the cells 38 are closed near the inlet or outlet end face 34 or 36, as is indicated by shading in all three figures. A group of the cells 38 in each element 30 are inlet cells 38a which are open at the inlet end face 34 and closed near the outlet end face 36. Another group of the cells 38 of each element 30 are outlet cells 38b which are closed near the inlet end face 34 and opened at the outlet end face 36 of the element 30. A smooth outer wall 39 surrounds the thin walls 32 and extends between the end faces 34 and 36. The elements 30 are of conventional construction and may have any cellular geometries, cellular arrangements, and numbers and/or arrangements of inlet and outlet cells as desired. Pending patent applications Ser. No. 165,646, filed July 3, 1980 and Ser. Nos. 350,998, 350,995, 350,994, 351,126, 350,993, 350,997 and 350,996 filed Feb. 22, 1982, assigned to the assignee hereof and incorporated by reference herein, each describe and claim various unidirectional flow type honeycomb filters which may be used in practicing the subject invention. The filter elements 30 are fabricated in a conventional fashion from porous materials and preferably monolithically with a porous outer wall interconnected with the thin walls from extruded, sintered cordierite ceramic materials having cordierite cement plugs to close the cell ends, as is described in the aforesaid application Ser. No. 165,646. Such filters are chemically and mechanically stable with combustion exhausts and most other fluids to temperatures approaching 1200° C. and thus may be used to filter fluids at elevated temperatures. Still other combinations of cordierite materials which can be used to fabricate filters stable to temperatures above 1300° C. are described in yet another pending application Ser. No. 295,612, filed Aug. 24, 1981, assigned to the assignee of this application and incorporated by reference.

For diesel particulate filtration, the thin walls 32 of the filter are desirably less than about 0.06 in. (about 1.5 mm.) to minimize filter volume and thermal shock problems. The cordierite thin walls can be formed in thicknesses as narrow as about 0.002 in. (about 0.05 mm.) and are preferably formed in thicknesses of between about 0.010 and 0.030 in. (0.25 and 0.76 mm.). The volumetric open porosity is at least 25% of the bulk volume of the thin walls 32 and preferably between about 40 and 70% to minimize hydraulic resistance to the fluid flow. The open porosity may be formed by pores having mean diameters of between about 1 and 60 micrometers (i.e. microns) although a range of 10 to 50 microns is preferred, depending upon the application. Useful transverse cross-sectional cellular densities for diesel particulate filters may range from between about 10 and 300 cells/in.$^2$ (about 1. and 46 cells/cm.$^2$) with densities of between about 100 and 200 cells/in.$^2$ (about 15.5 and 31 cells/cm.²) preferred with the indicated preferred open porosity and wall thicknesses.

The housing 10 is further provided with a partition 40 through which the elements 30 are mounted. The partition 40 separates the interior of the housing 10 into an inlet chamber portion 42 and an outlet chamber portion 44 and prevents the contaminated fluid 22 entering the inlet chamber portion 42 from bypassing the filter elements 30. The inlet chamber 42 also serves as a means for directing the horizontal flow of the incoming contaminated fluid 22 (horizontal in FIGS. 1 and 3) downward into the elements 30 as indicated by arrows 22a. The outlet chamber 44 serves a similar purpose to divert the flow of the filter fluid exiting the outlet end face 36 of the elements 30 vertically (this flow being indicated by arrows 28) to the horizontal direction and through the outlet 24 of the housing 10. The elements 30 are mounted through the partition 40 with the inlet end face 34 of each exposed in the inlet chamber 42 in order that the elements 30 operate in parallel to filter the particulate contaminated gas 22. The outlet end faces 36 are each similarly exposed in the outlet chamber 44 so that fluid is not repeatedly filtered within the housing 10. Conventional methods and materials used in the construction of mufflers, catalytic converters, other diesel particulate filters and exhaust systems generally are used in fabricating and joining the upper and lower shells 12 and 14 and partition 40 and in fixing the elements 30 in the partition 40 and closing or otherwise sealing any space between the elements 30 and partition 40 to prevent blowby of the particulate contaminated gas 22. It is envisioned that the shells 12 and 14 and partition 40 will be formed of metal and the partition 40 affixed to the lower shell 12 by welds 42 or brazing or joiners (not depicted) and form a compression seal against the upper shell 14 to complete the division of the housing into the two chambers 42 and 44.

The effective cross-sectional area of the plurality of elements 30 is represented in FIG. 2 by the circle 46, in phantom, having an effective diameter D. The circle 46 is equal in area to the sum of the cross-sectional areas of the plurality of elements 30 transverse to the central longitudinal axes 48 of their cells (see FIG. 3) as the elements 30 act in parallel to filter the fluid 22. The effective length L of the plurality of elements 30 is indicated in phantom in FIG. 3 and is equal to the length 1 of the individual elements 30, which are equal in this embodiment but need not be so. The effective length L of the plurality of elements 30 is less than their effective diameter D. The effective length 1 of each element 30 may also be approximately equal to (or less than) its effective diameter d to maximize the improved particulate capacity and operating time characteristics provided by this this apparatus, although a range of $0.4 \leq 1/d \leq 2.0$ is acceptable and $0.7 \leq 1/d \leq 1.4$ is preferred. A significant benefit of the invention is that the chambers 42 and 44 allow the hot exhaust gases to circulate around the outer wall 39 of each element 30 thus minimizing the occurrence of either thermal gradients in each element. This factor, combined with the use of several small filter elements 30 in parallel, greatly reduce the likelihood of filter damage due to thermal shock and extruded high temperature operation while providing a high aspect ratio filtration system.

The apparatus of FIGS. 1a, 2 and 3 is envisioned to be mounted as is depicted in FIG. 1 on the underside of the vehicle 1 in which a diesel engine 3 is installed with the filters 30 arrayed in a horizontal plane with their greater dimension d parallel to the plane to minimize the height of the housing 10 beneath the vehicle. The elements 30 may be varied in number, size, and shape and the arrangement of the elements 30 may be varied from that depicted so as to conform to the housing 10 to any spatial limitations which may be imposed. Moreover, the inlet 18 and outlet 24 need not be essentially parallel to one another and perpendicular to the central longitudinal axes of the cells 38 of the elements 30, as depicted in FIGS. 1a, 2 and 3, if other arrangements are more useful in installing the apparatus.

Figure 4:
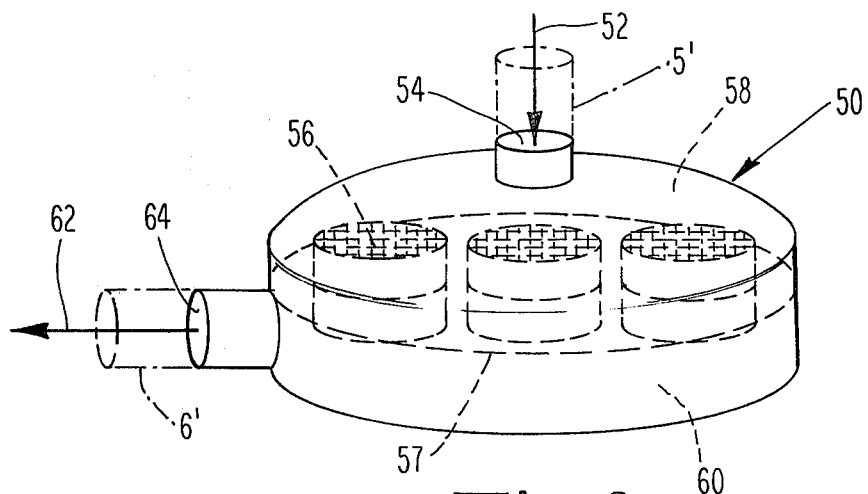
FIG. 4 is an alternate envisioned embodiment of the apparatus.

FIG. 4 depicts diagrammatically a second exemplary apparatus 50 for mounting directly beneath a diesel engine. Exhaust gas represented by arrow 52 flows downward from an upstream pipe 5', in phantom, leading from the engine through an inlet 54 and passes through a plurality of unidirectional flow type filter elements 56, indicated in phantom, positioned through a partition 57 (also depicted in phantom) dividing the housing 50 into an inlet chamber 58 and outlet chamber 60. The filtered exhaust gas, represented by the arrow 62 passes from the housing 50 through an outlet 64, into a downstream pipe 6', in phantom, and through the remainder of the exhaust system. The outlet chamber 60 acts to convert the momentum of the exhaust gas from the vertical to horizontal directions.

While several embodiments of the invention have been described and other embodiments and modifications thereto have been suggested, it should be understood that other modifications could be made in the structure, composition and/or arrangements of the described elements without departing from the scope of the invention which is more fully defined in the following claims.

What is claimed is:

1. In a conduit transporting a fluid contaminated with solid particulates between a source and a disposal point a solid particulate filtering apparatus comprising:

a housing across said conduit having an inlet connected to an upstream portion of the conduit extending from said source and an outlet connected to a downstream portion of the conduit continuing to said disposal point;

a plurality of honeycomb filter elements located in the housing, each element being formed by a multiplicity of interconnected thin walls defining an inlet end face and an opposing outlet end face and a multiplicity of cells extending substantially mutually parallel and longitudinally through the element between the inlet and outlet end faces, an inlet group of the cells being open at the inlet end face and closed near the outlet end face, an outlet group of the cells being closed near the inlet end face and open at the outlet end face, the thin walls having interconnected open porosity of a volume and size sufficient to enable the fluid to flow at least across the narrow dimensions of the thin walls and to prevent at least a significant portion of the solid particulates from passing across or through the thin walls in any direction; and the elements being positioned in said housing such that the inlet end faces of all of said plurality of elements generally lie in a common plane and are exposed to the contaminated fluid transported to the housing through the upstream portion of the conduit, and the cells of all of the plurality of elements commonly extend substantially mutually parallel to each other, whereby said elements act in parallel to filter said fluid.

2. The apparatus of claim 1 wherein said plurality of filters collectively have an effective diameter D and an effective length L less than said diameter D.

3. The apparatus of claim 2 wherein each of said plurality of filter elements has an effective diameter d and an effective length l less than said effective diameter d of each of the elements.

4. The apparatus of claim 1 wherein said elements are formed from ceramic materials.

5. The filter of claim 4 wherein the interconnected open porosity is greater than about 25% of the thin wall bulk volume and is formed by pores having mean diameters greater than about 1 micron.

6. A method of filtering solid particulates from fluids comprising the steps of:
dividing a conduit carrying the contaminated fluid into an upstream portion and a downstream portion with a partition;
positioning a plurality of honeycomb filter elements through the partition, each element being formed by a multiplicity of thin interconnected walls defining an inlet end face and an opposing outlet end face and a multiplicity of inlet and outlet cells extending between the inlet and outlet end faces, the inlet cells being open at the inlet end face and closed near the outlet end face, the outlet cells being closed near the inlet end face and open at the outlet end face, the thin walls having interconnected open porosity of a volume and size sufficient to enable the fluid to flow at least across the narrow dimensions of the thin walls between adjoining cells and to prevent at least a significant portion of the solid particulates in the exhaust gas from passing entirely across or through the thin walls in any direction, the inlet end faces of all of said plurality of elements generally lying in a common plane and communicating with the upstream portion of the conduit, the cells of all of the plurality of elements commonly extending substantially mutually parallel to each other, and the outlet end face of each element communicating with the downstream portion of the conduit; and
passing the fluid through the conduit and plurality of filters.

7. The method of claim 6 wherein the effective diameter of the plurality of filter elements have an effective length L and an effective diameter D greater than said effective length L.

8. In a diesel engine exhaust gas pipe, a plurality of honeycomb filter elements positioned in a partition dividing the pipe into an upstream portion and a downstream portion, each filter element having an effective diameter d and an effective length l and comprising a matrix of thin porous walls defining an outlet inlet end face and an outlet end face on opposing outer surfaces of the filter and a multiplicity of cells extending substantially longitudinally and in a substantially mutually parallel fashion through the filter between the end faces, an inlet group of the cells open at the inlet end face and closed near the outlet end face, and an outlet group of the cells open at the outlet end face and closed near the inlet end face, the improvement comprising the ratio of d to l being greater than or equal to 1.0, the inlet end faces of all of said plurality of elements generally lying in a common plane and the cells of all of the plurality of elements commonly extending substantially parallel to each other.

* * * * *